Nov. 15, 1966   B. E. RESENER   3,285,395
CONVEYOR CHAIN
Filed Sept. 14, 1964   2 Sheets-Sheet 1
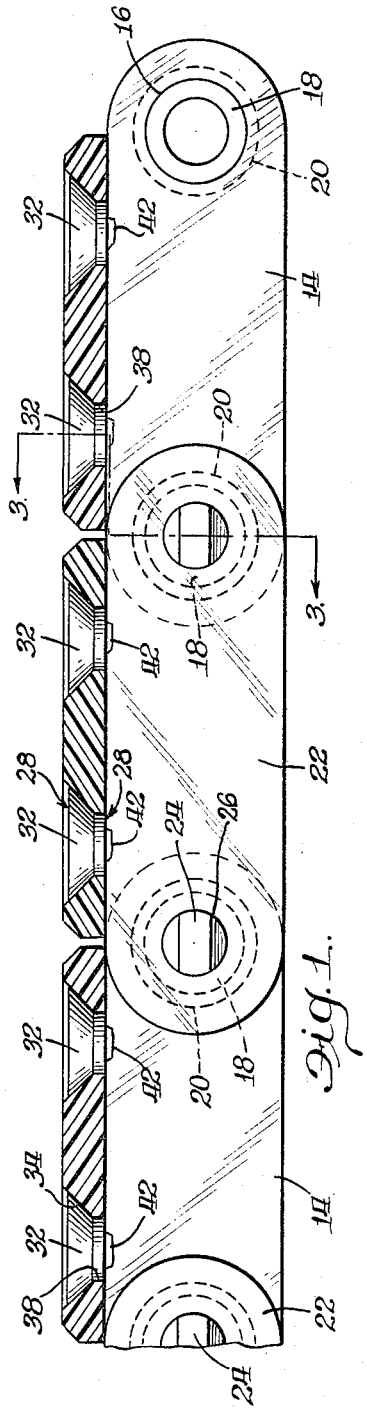
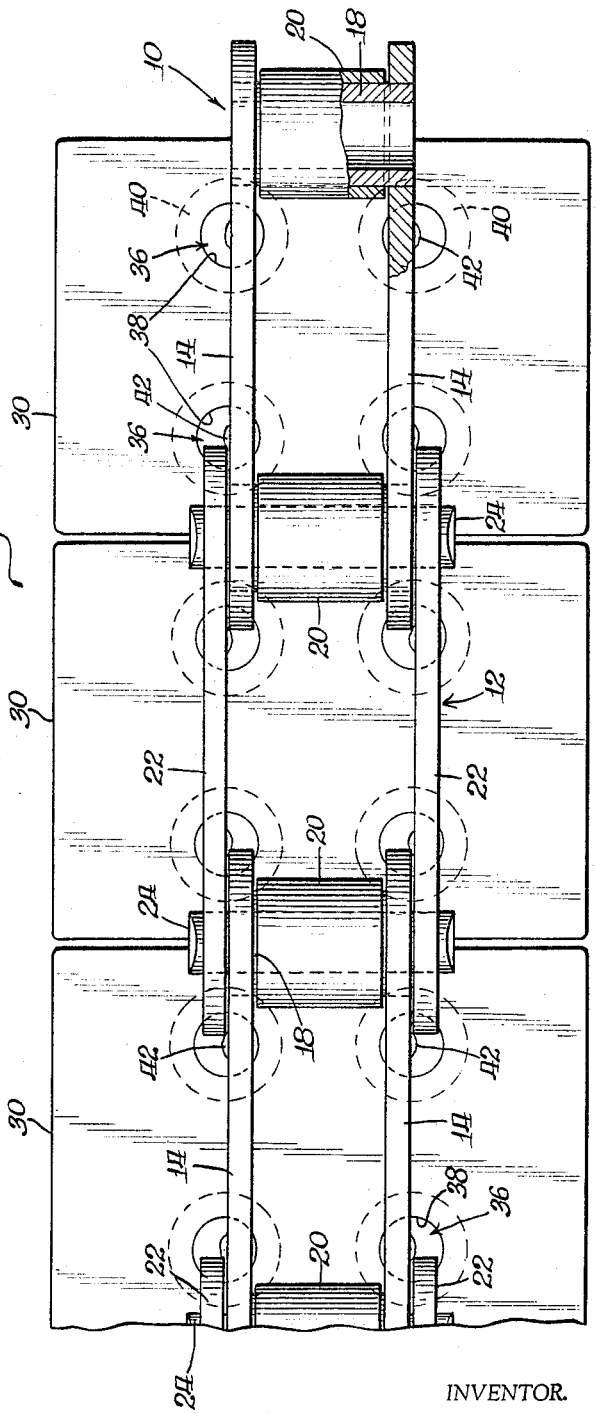
INVENTOR.
Baird E. Resener
BY Walter J. Schlegel, Jr.
Atty.

Nov. 15, 1966
B. E. RESENER
3,285,395
CONVEYOR CHAIN
Filed Sept. 14, 1964
2 Sheets-Sheet 2
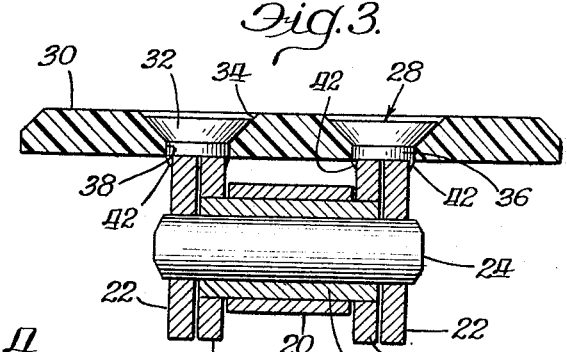
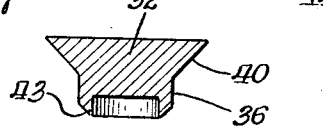
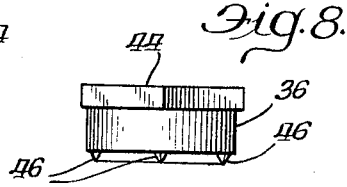
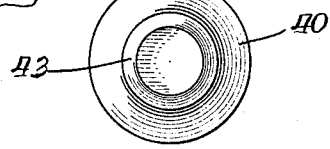
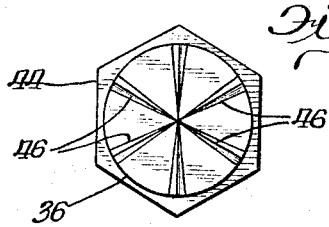
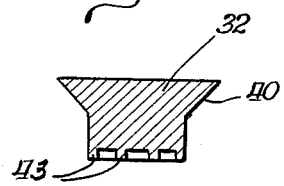
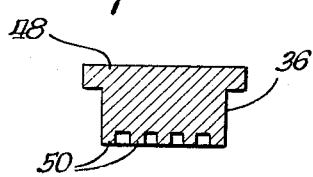
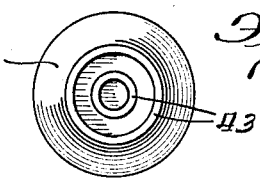
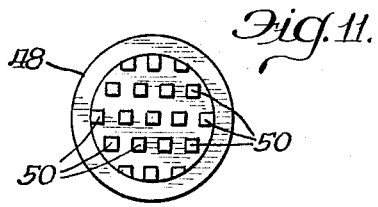
INVENTOR.
Baird E. Resener
BY Walter S. Schlegel Jr.
Atty.
Witness:
Peter Andrus

United States Patent Office 3,285,395
Patented Nov. 15, 1966

3,285,395
CONVEYOR CHAIN
Baird E. Resener, Indianapolis, Ind., assignor to Amsted Industries Incorporated, Chicago, Ill., a corporation of New Jersey
Filed Sept. 14, 1964, Ser. No. 396,019
2 Claims. (Cl. 198—189)

This invetion relates to conveyer chains and, more particularly, to conveyor chains of the type comprising a conveyor platform secured to each of a plurality of pivotally interconnected links.

It is well known in the art to fabricate conveyor chains by securing to each link of a conventional power-transmission chain a platform called a top plate for supporting and carrying the articles to be moved by the conveyor chain. Roller chains comprised of pivotally inter-connected, alternating roller links and pin links are most commonly utilized in the manufacture of these conveyor chains, but it is difficult to secure the top plates in a fixed position on the chain links, especially when the top plates are fabricated of an organo-plastic material.

This invention is based on an improved conveyor chain comprising pivotally interconnected links which are provided with top plates secured to the top edges of the link plates by weldable studs that are projection welded to the link plates. The weldable studs which are employed are especially suited for projection welding. Roller-type power-transmission chains of conventional design are most conveniently used for manufacturing the conveyor chains of this invention.

It is, therefore, a primary object of this invention to provide conveyor chains including rigidly secured top plates.

Another object of this invention is to provide conveyor chains which are readily assembled.

Still another object of this invention is to provide conveyor chains having top plates secured to chain links by weldable studs which are projection welded to the chain links.

A further object of this invention is to provide weldable studs which are especially suited for projection welding.

These and further objects of this invention will become apparent or be described as the description thereof herein proceeds and reference is made to the accompanying drawings in which:

FIGURE 1 is a fragmentary side elevation, partly in section, of a conveyor chain embodying this invention;

FIGURE 2 is a plan view of the lower side of the chain shown in FIGURE 1;

FIGURE 3 is a sectional view taken on the line 3—3 of FIGURE 1;

FIGURE 4 is a vertical sectional view of one embodiment of a weldable stud for fabricating the conveyor chains;

FIGURE 5 is a view of the shank end of the weldable stud illustrated in FIGURE 4;

FIGURE 6 is a vertical sectional view of another embodiment of a weldable stud;

FIGURE 7 is a view of the shank end of the weldable stud of FIGURE 6;

FIGURE 8 is an elevation of still another embodiment of a weldable stud;

FIGURE 9 is a view of the shank end of the weldable stud of FIGURE 8;

FIGURE 10 is a vertical sectional view of a fourth embodiment of a weldable stud; and FIGURE 11 is a view of the shank end of the weldable stud illustrated in FIGURE 10.

Referring to FIGURES 1 to 3, the chain illustrated is a conventional roller chain consisting of alternating roller (or inner) links 10 and pin (or outer) links 12, pivotally interconnected. Each roller link 10 is fabricated of a pair of spaced, parallel link plates 14 having adjacent each end thereof holes 16 in which bushings 18 are received with a press fit. Bushings 18 rotatably support rollers 20 for engagement with the teeth of the sprockets with which the chain is to be used. Roller links 10 are interconnected by pin links 12 which include a pair of spaced, parallel link plates 22 overlapping the ends of adjacent roller links 10. Connection between the overlapping ends of roller links 10 and pin links 12 is accomplished by pins 24. Pins 24 rotatably support bushings 18 and are press-fitted in holes 26 adjacent the ends of link plates 22.

Secured to each of roller links 10 and pin links 12 by weldable studs 28 is a top plate 30 surmounting the links to form a surface for supporting articles transported by the chain. Weldable studs 28 are formed with enlarged head portions 32 having overhanging beveled surfaces and shank portions 36. Head portions 32 are seated in frustoconical depressions 34 and shank portions 36 extend through apertures 38 and are secured, as by welding, to the chain link plates. Head portions 32 are designed with upper flat surfaces that are substantially coplanar with, e.g., slightly below, the top surface of top plates 30. Although top plates 30 are preferably fabricated of a plastic material, such as nylon, other materials, e.g., metals, may also be employed.

It is preferred that top plates 30 be fabricated as hereinafter described so that the same plates may be used with either roller links 10 or pin links 12 even though they are inherently of different widths. The interchangable plates are designed with apertures 38 (and depressions 34) located in top plates 30 so that the apertures on each side of top plates 30 are longitudinally aligned and the lateral distance between the axes of the apertures on the two sides of top plates 30 is substantially the same as the distance between the outer faces of plates 14. More specifically, the lateral distance between the axes of apertures 38 is preferably about equal to the distance between the outer faces of plates 14 of roller links 10 plus the running clearance between the adjacent link plates 14 and 22. Since the only difference in the distances between the outer faces of a pair of plates 14 and the inner faces of a pair of plates 22 is the running clearances between each link plate 14 and the adjacent link plate 22, it will be evident that shank portions 36 of the weldable studs 28 extending through apertures 38 located as described will partly register with both of the link plates of either roller links 10 or pin links 12, as illustrated.

In the preferred method of securing top plates 30 to the chain links, weldable studs 28 are projection welded to the link plates to hold top plates 30 in place. Weldable studs 28 are fabricated so that the lower ends of shank portions 32 are substantially coplanar with the bottom surfaces of top plates 30 when weldable studs 28 are seated in apertures 38. The welding projections extend in an axial direction from the lower ends of shank portions. Directional orientation of weldable studs 28 will not be required before the projection-welding operation if the welding projections are symmetrical about the axes of weldable studs 28. The chain links are fabricated by inserting weldable studs 28 in apertures 38 (and depressions 34) so that the projections rest on the top edges of the link plates. The welding current is then initiated to collapse the projections until the lower ends of shank portions contact the top edges of the link plates with the beveled surfaces 40 seated in depressions 34. The collapsed projections form nubs 42 to bond weldable studs 28 to the chain link plates.

Examples of weldable studs which are especially useful for the fabrication of the conveyor chains of this invention are illustrated in FIGURES 4 to 11. Referring specifically to FIGURES 4 and 5 for an example of a weldable stud that may be used for securing the top plate of the conveyor chain illustrated in FIGURES 1 to 3, each weldable stud is formed with enlarged head portion 32 formed with overhanging beveled surface 40 which is seated within frusto-conical depression 34 (FIGURES 1 to 3). Axially extending from head portion 32 is shank portion 36 formed with annular projection 43 at the end thereof. If desired, projection 43 may have a beveled end wall, as illustrated.

In referring to FIGURES 6 and 7 it can be seen that the weldable stud illustrated is substantially the same as that shown in FIGURES 4 and 5 except that shank portion 36 is formed with two concentric annular projections 43 of the same height extending in an axial direction from the end of shank portion 36.

Reference is now made to FIGURES 8 and 9 wherein the weldable stud illustrated is formed with hexagonal head 44 which may be seated either against the top surface of the top plate or against a shoulder formed within the recess in the top plate so that the upper surface of head 44 is coplanar with the upper surface of the top plate. The extended end of shank portion 36 is provided with a plurality of equidistantly-extending radial projections 46 of triangular cross-section which increase in width in a radial direction.

Still another example of a suitable weldable stud is illustrated in FIGURES 10 and 11 wherein shank portion 36 axially extends from enlarged cylindrical head 48, which may be seated against the upper surface of the top plates or be received within a recess in the top plates. Extending in an axial direction from the end of shank portion 36 are a plurality of spaced stud-type projections 50 of substantially the same size (i.e., same cross-sectional area and height) so as to resemble a plate of a waffle iron.

Although this invention has been described in relation to specific embodiments, it will be apparent that obvious modifications may be made by one skilled in the art without departing from the intended scope of this invention as defined by the appended claims. For example, while only one weldable stud may be used to hold each of the top plates to the chain links, it will be apparent that the top plates are more effectively secured in a fixed position with respect to the chain links by using at least two weldable studs to hold each top plate. It is preferred that at least one weldable stud be used to hold the top plates to each link plate of lower chain links. The weldable studs illustrated in FIGURES 4 to 11 are only examples of weldable studs which may be used and a head of any suitable configuration may be used with each of the several illustrated and described projections.

I claim:
1. A conveyor chain of the type including alternating pairs of elongated metallic roller and pin link plates pivotally interconnected in adjoining and overlapping series by means of cross pins, each pair of link plates having a top plate extending across and beyond the top edges thereof, said top plates including at least one aperture registering with each of the lower link plates, the axes of said apertures being substantially aligned with the inner faces of said pin link plates and with the outer faces of said roller link plates, and a metallic weldable stud extending through each of said apertures, said weldable studs being formed at one end with a head seated against said top plate and welded at the other end to the respective link plate, whereby said top plate is held in a fixed position with respect to said link plates.

2. A conveyor chain of the type including alternating pairs of elongated metallic roller and pin link plates pivotally interconnected in adjoining and overlapping series by means of cross pins, each pair of link plates having a top plate fabricated of an organo-plastic material extending across and beyond the top edges thereof, said top plates including at least one aperture registering with each of the lower link plates, the axes of said apertures being substantially aligned with the inner faces of said pin link plates and with the outer faces of said roller link plates, and a metallic weldable stud extending through each of said apertures, said weldable studs each being formed at one end with an enlarged head portion seated within a recess in said top plate and being projection welded at the other end to the respective link plate, whereby said top plate is held in fixed position with respect to said link plates.

References Cited by the Examiner

UNITED STATES PATENTS

| | | | |
|---|---|---|---|
| 1,039,137 | 9/1912 | Johnson. | |
| 1,132,989 | 3/1915 | Walker. | |
| 1,961,645 | 6/1934 | Shomaker | 198—189 |
| 2,110,832 | 3/1938 | Hogg et al. | 219—98 |
| 2,143,593 | 1/1939 | Bryant | 198—189 |
| 2,167,285 | 7/1939 | Smith | 219—93 X |
| 2,993,982 | 7/1961 | Glover | 219—98 X |

FOREIGN PATENTS 386,332  12/1964  Switzerland.

EVON C. BLUNK, *Primary Examiner.*

R. WALKER, M. L. AJEMAN, *Assistant Examiners.*